United States Patent [19]

Karim

[11] Patent Number: 4,482,428

[45] Date of Patent: Nov. 13, 1984

[54] SMOOTH-LOOK FOOTWEAR PROCESS

[75] Inventor: Karl A. Karim, Houston, Tex.

[73] Assignee: Shell Oil Company, Houston, Tex.

[21] Appl. No.: 603,057

[22] Filed: Apr. 23, 1984

[51] Int. Cl.³ .................. B29C 17/08; B44C 1/22; C03C 15/00; C03C 25/06
[52] U.S. Cl. .................................. 156/668; 156/654; 252/79.2; 264/341
[58] Field of Search ............... 252/79.2; 156/639, 635, 156/640, 625, 654, 668; 264/340, 341; 427/307; 36/87, 126–131, 43, DIG. 2

[56] References Cited

U.S. PATENT DOCUMENTS

| Re. 28,236 | 11/1974 | Hendricks et al. | 36/2.5 R |
| 3,597,336 | 8/1971 | Shotton et al. | 204/30 |
| 3,689,303 | 9/1972 | Maguire et al. | 156/668 X |

Primary Examiner—William A. Powell
Attorney, Agent, or Firm—Peter A. Bielinski

[57] ABSTRACT

The present invention relates to a process for dulling molded block copolymer compositions comprising contacting the surface of a molded block copolymer rubber composition with an etching solution of chromic acid optionally rinsing and drying.

6 Claims, No Drawings

SMOOTH-LOOK FOOTWEAR PROCESS

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler. For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of compression molded vulcanized conventional rubber, injection molded poly(vinyl chloride) or leather. A new process has now been found that produces a smooth dull surface and also is non-delaminating.

SUMMARY OF THE INVENTION

The present invention relates to a process for dulling molded block copolymer compositions comprising contacting the surface of a molded block copolymer rubber composition with an etching solution of chromic acid optionally rinsing and drying.

In order to dull the shiny surface of articles made of molded block copolymer rubber compositions a chromic acid etching solution was developed. This solution will leave small imperfections on the surface of the composition to scatter the incident light. These imperfections are too small to be seen by the naked eye but large enough to resolve light. The process of dulling involves contacting by for example dipping the molded article in the etching solution followed by rinsing and drying. Other methods of treatment such as brushing or spraying may be used. The mechanism of dulling may be explained as follows: When the etching solution contacts the molded article the chromic acid selectively dissolves the rubber portion of the blend producing an etched surface. It is believed that during etching, the unsaturated rubber phase near the surface is attacked more readily than the polystyrene phase, leading to a cavitated surface. This cavitated surface scatters the incident light causing dullness. In addition to dulling the surface of block copolymer compositions, the above process may be used to eliminate the unsightly splashes or frostings on the surface of molded articles. Presently, the industry is using a "cleaning solution" based on methyl ethylketone. This solution is relatively expensive and far inferior to the present etching solution.

DETAILED DESCRIPTION OF THE INVENTION

The chromic acid etching solution may be coated or applied to the surface of the molded composition by any convenient means. These means may include dipping spraying or brushing. The solution should be applied in a uniform coat so as to obtain uniform dulling. The concentration of the solution may be varied so as to optimize for a particular method.

The time required to achieve the desired dull look may vary depending on the concentration of the etching solution and its temperature. For example a molded article immersed in the chromic acid etching solution needed approximately 6 hours to obtain a smooth dull look.

The dulling process may be accellerated by increasing the temperature of the etching solution. For example a dull look was obtained on a molded article in contact with the etching solution for 5 minutes at a temperature of 185° C.

Molded articles should be rinsed with, for example, water and dryed to prevent contamination with the acid. Drying can be accomplished by any convenient means, e.g., air drying with optional heat.

ILLUSTRATIVE EMBODIMENT

An etching solution was prepared by mixing stoichiometric amounts of chromium trioxide and concentrated sulfuric acid. The etching solution as above was applied to a molded styrene-butadiene-styrene block copolymer shoe sole by dipping the shoe sole in the etching solution. After rinsing and air drying, the shoe sole had a smooth, dull finish without visible surface imperfections.

What is claimed is:

1. A process for dulling molded block copolymer compositions comprising contacting the surface of a molded block copolymer rubber composition with a chromic acid etching solution, optionally rinsing and drying.
2. The process of claim 1 wherein the molded composition is a styrene-butadiene block copolymer composition.
3. The process of claim 1 wherein the etching solution is sprayed on the molded composition.
4. The process of claim 1 wherein the molded composition is dipped in the etching solution.
5. The process of claim 1 wherein the etching solution is brushed on the molded composition.
6. The process of claim 1 wherein the etching solution is formed by mixing chromium trioxide and sulfuric acid.

* * * * *